United States Patent
Allen et al.

(10) Patent No.: US 8,857,629 B2
(45) Date of Patent: Oct. 14, 2014

(54) COMPOSITE MEMBRANE WITH MULTI-LAYERED ACTIVE LAYER

(75) Inventors: Robert David Allen, San Jose, CA (US); Young-Hye Na, San Jose, CA (US); Ratnam Sooriyakumaran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 12/837,148

(22) Filed: Jul. 15, 2010

(65) Prior Publication Data

US 2012/0012527 A1    Jan. 19, 2012

(51) Int. Cl.

| | |
|---|---|
| *B01D 71/56* | (2006.01) |
| *B01D 71/38* | (2006.01) |
| *B01D 69/02* | (2006.01) |
| *B01D 69/12* | (2006.01) |
| *C02F 101/10* | (2006.01) |
| *B01D 61/02* | (2006.01) |
| *C02F 1/44* | (2006.01) |
| *B01D 61/00* | (2006.01) |
| *C02F 103/08* | (2006.01) |

(52) U.S. Cl.
CPC ........... *B01D 69/12* (2013.01); *C02F 2101/103* (2013.01); *B01D 61/027* (2013.01); *C02F 1/444* (2013.01); *B01D 2323/30* (2013.01); *B01D 61/00* (2013.01); *B01D 69/02* (2013.01); *C02F 1/441* (2013.01); *B01D 61/025* (2013.01); *B01D 71/56* (2013.01); *C02F 2101/108* (2013.01); *C02F 1/44* (2013.01); *C02F 2103/08* (2013.01); *B01D 69/125* (2013.01)
USPC ...................... 210/500.38; 210/652

(58) Field of Classification Search
None
See application file for complete search history.

(56) References Cited

U.S. PATENT DOCUMENTS

| | | | |
|---|---|---|---|
| 4,039,440 A | | 8/1977 | Cadotte |
| 4,277,344 A | | 7/1981 | Cadotte |
| 4,520,044 A | | 5/1985 | Sundet |
| 4,769,148 A | | 9/1988 | Fibiger et al. |
| 5,019,264 A | | 5/1991 | Arthur |
| 5,085,777 A | | 2/1992 | Arthur |
| 5,674,398 A | * | 10/1997 | Hirose et al. ............. 210/500.38 |
| 6,177,011 B1 | | 1/2001 | Hachisuka et al. |
| 6,913,694 B2 | | 7/2005 | Koo et al. |
| 7,490,725 B2 | | 2/2009 | Pinnau et al. |
| 7,537,697 B2 | | 5/2009 | Koo et al. |
| 2008/0035571 A1 | | 2/2008 | Sabottke et al. |
| 2008/0035572 A1 | | 2/2008 | Sabottke et al. |
| 2008/0234460 A1 | * | 9/2008 | Saegusa et al. ............... 528/361 |
| 2010/0216899 A1 | | 8/2010 | Allen et al. |

FOREIGN PATENT DOCUMENTS

JP    3438278    8/2003

OTHER PUBLICATIONS

JP 07-171361—english machine translation.*
R.L. Riley et al., "Spiral-Wound Poly(Ether/Amide) Thin-Film Composite Membrane Systems", Desalination, 19 (1976) 113-126.
Karol J. Mysels et al., "Strength of Interfacial Polymerization Films", Langmuir 1991, 7, 3052-3053.

(Continued)

*Primary Examiner* — Krishnan S Menon (74) *Attorney, Agent, or Firm* — Shumaker & Sieffert, P.A.

(57) ABSTRACT

A polymeric membrane includes an active layer on a support. The active layer includes at least two chemically distinct crosslinked, polyamide films, and the films are crosslinked with each other at an interface.

8 Claims, 2 Drawing Sheets

(56) References Cited

OTHER PUBLICATIONS

Guodong Kang et al., "A novel method of surface modification on thin-film composite reverse osmosis membrane by grafting poly(ethylene glycol)", Polymer 48 (2007) 1165-1170.

Young-Hye La et al.. "Novel thin film composite membrane containing ionizable hydrophobes: pH-dependent reverse osmosis behavior and improved chlorine resistance", J. Mater. Chem., 2010, 20, 4815-4620.

Robert J. Petersen, "Composite reverse osmosis and nanofiltration membranes", Journal of Membrane Science, 83 (1993) 81-150.

Li-Fen Liu et al., "Study on a novel polyimide-urea reverse osmosis composite membrane (ICIC-MPD) I. Preparation and characterization of ICIC-MPD membrane", Journal of Membrane Science 281 (2006) 88-94.

Meihong Liu at al., "Preparation, structure characteristics and separation properties of thin-film composite polyimide-urethane seawater reverse osmosis membrane", Journal of Membrane Science, 325 (2008) 947-956.

* cited by examiner

COMPOSITE MEMBRANE WITH MULTI-LAYERED ACTIVE LAYER

TECHNICAL FIELD

The present invention relates to membranes that can be used, for example, in water purification, desalination and gas separation processes. The active layer of the membranes includes at least two chemically distinct crosslinked polyamide films having an interface where the thin films are crosslinked with each other.

BACKGROUND

Thin film composite (TFC) membranes including ultra-thin active layers and porous supports have been widely used in reverse osmosis (RO) or nanofiltration (NF) processes for desalination. The active layer in a TFC membrane controls separation properties, while the support layer enhances mechanical strength.

The crosslinked aromatic polyamide produced by interfacial polymerization of m-phenylenediamine (MPD) and trimesoyl chloride (TMC) has been a successful commercial product. Although the crosslinked aromatic polyamide TFC membranes show very high salt rejection (≥99%) and reasonable water flux (20~55 LMH), the membranes are not sufficiently effective in filtering out harmful toxins such as arsenic and boron, and they also can be sensitive to chemical disinfectants such as chlorine. Chemical attack by disinfectants ultimately results in membrane failure as measured by enhanced passage of both salt and water.

SUMMARY

In one aspect, the present invention is directed to a thin film composite (TFC) membrane construction including an active layer on a support layer. The active layer of the membrane includes at least two chemically distinct crosslinked sub-layers, which are crosslinked at their interface.

In one embodiment, the active layer of the membrane includes a first polyamide layer and a second polyamide layer, with the second polyamide layer being structurally different from the first polyamide layer. In some embodiments, the second polyamide layer includes a polymer with a polyamide backbone and a fluoroalcohol moiety pendant from the backbone.

In another aspect, the present invention is directed to a method of making a composite membrane, including:

(i) applying a chemical mixture (A) to a support membrane to form a treated support membrane, wherein the chemical mixture (A) comprises an aqueous solution of a monomeric polyamine reactant represented by Formula 1:

$$R(NH_2)_z \quad \text{Formula 1}$$

wherein R represents an organic group selected from aliphatic, alicyclic, aromatic, heterocyclic groups and combinations thereof, and z represents an integer of 2 or more;

(ii) applying a chemical mixture (B) to the treated support membrane to form a first active layer on the support membrane, wherein the chemical mixture (B) comprises an organic solvent and a monomeric polyfunctional acyl halide reactant represented by Formula 2:

$$R^1\text{-(COX)}_p \quad \text{Formula 2}$$

wherein $R^1$ represents an organic group selected from the group containing aliphatic alicyclic, aromatic, heterocyclic groups and combinations thereof, X is selected from the group consisting of fluorine, chlorine, bromine and iodine, and p represents an integer of 2 or more; and (iii) applying a chemical mixture (C) to the first active layer, wherein the chemical mixture (C) comprises an aqueous base and a monomeric polyamine reactant having one or more hexafluoroalcohol groups represented by Formula 1A:

Formula 1A wherein $R^0$ represents an organic group selected from the group consisting of aliphatic, alicyclic, aromatic, heterocyclic groups and combinations thereof, m is an integer of 2 or more, and n is an integer of 1 or more.

The materials of the active layer can be selected to take advantage of synergy between the characteristic beneficial properties of the sub-layers, which can be a cost effective way to improve overall membrane performance. For example, when the membrane is used to purify saline water, the first layer can be selected to efficiently reject salt, while the second layer can be selected to provide at least one of the following beneficial properties to the membrane: enhanced salt rejection, efficient removal of toxins, or resistance to chemical attack by disinfectants.

The multi-level active layer construction may be cost-effectively produced using a sequential interfacial polymerization process.

The details of one or more embodiments of the invention are set forth in the accompanying drawings and the description below. Other features, objects, and advantages of the invention will be apparent from the description and drawings, and from the claims.

DETAILED DESCRIPTION

In one aspect, the present invention is directed to a thin film composite (TFC) membrane construction including an active layer formed on a support layer. The active layer of the membrane includes at least two chemically distinct crosslinked sub-layers, which are crosslinked at their interface. In one embodiment, the active layer of the membrane includes a first polyamide layer and a second polyamide layer. The second polyamide layer includes a polymer with a polyamide backbone and at least one fluoroalcohol moiety pendant from the backbone. Either the first layer or the second layer may be adjacent the support layer.

The support layer of the TFC membrane, which is adjacent to the active layer, may vary widely depending on the intended application of the composite membrane. Any ultrafiltration membrane can be used as a support layer for making RO/NF membranes through interfacial polymerization, and polyethersulfone, poly(vinylidene floride), polyetherimide and polyacrylonitrile would be suitable for use with the layered polyamides described herein.

Figure 1:
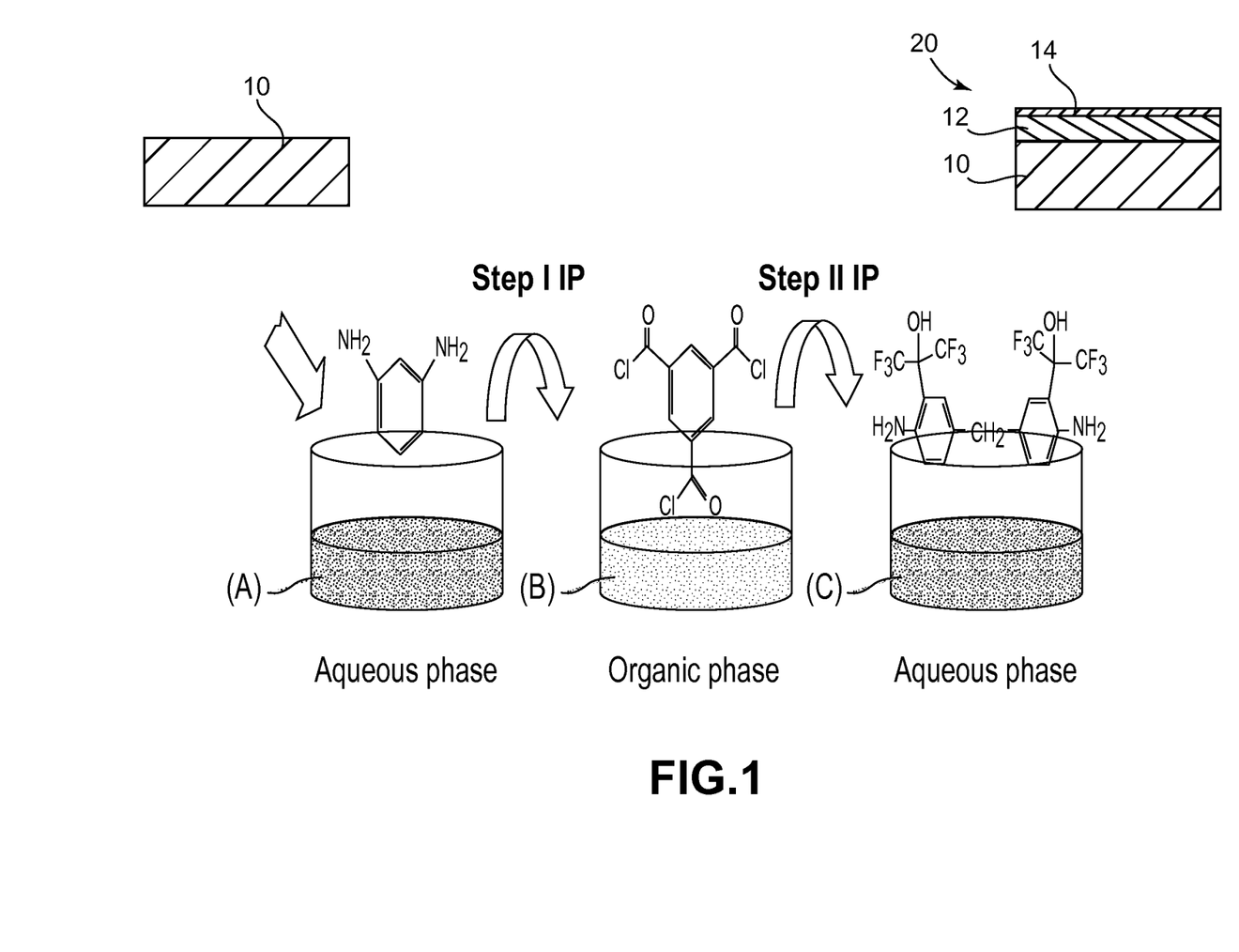
FIG. 1 is a schematic representation of a sequential interfacial polymerization procedure that may be used to fabricate the polyamide TFC membranes described in this disclosure.

The active layer includes at least two chemically distinct crosslinked sublayers, which are crosslinked at their interface. The active layers described herein are readily made using interfacial polymerization methods. In this application the term interfacial polymerization refers to a polymerization reaction that occurs at or near the interfacial boundary of two immiscible solutions. FIG. 1 is a schematic representation of a sequence of interfacial polymerization reactions that may be used to form the active layers of the TCF membrane. However, FIG. 1 represents only an example, and the present invention is not limited to this procedure.

In the embodiment shown in FIG. 1, the first sub-layer 12 of the TFC membrane 20 is derived from an interfacial polymerization reaction (Step I IP) between an aqueous chemical mixture (A) and an organic chemical mixture (B) on a support layer 10. The aqueous chemical mixture (A) and the organic chemical mixture (B) are immiscible with each other. When the mixtures (A) and (B) are placed in contact, immiscible means that there is an interface between (A) and (B). The chemical mixtures (A) and (B) can independently be solutions, dispersions, or combinations thereof. Preferably, both (A) and (B) are solutions, and will be referred to in the discussion that follows as solutions.

The aqueous chemical mixture (A) includes a monomeric polyamine reactant represented by Formula 1:

Formula 1 wherein R represents an organic group selected from aliphatic, alicyclic, aromatic, heterocyclic groups and combinations thereof, and z represents an integer of 2 or more, 2 to 20, or 2 to 8. In this application, the recitations of numerical ranges by endpoints include all numbers subsumed within that range (e.g., 1 to 5 includes 1, 1.5, 2, 2.75, 3, 3.80, 4, 5, etc.). In some embodiments, R includes an aromatic group, and more preferably consists of one or more aromatic groups.

In some embodiments, R in the monomeric polyamine reactant of Formula 1 represents an organic group with 2 to 30 carbon atoms, or 2 to 20 carbon atoms, or 6 to 20 carbon atoms. For example, R can include an aromatic organic group selected from benzene rings, naphthalene rings, cyclohexane rings, admanthane rings, norbornane rings and combinations thereof. In some embodiments, R in Formula 1 is a benzene ring, and z is equal to 2.

A base can be optionally added to aqueous solution (A) to improve the solubility of the monomeric polyamine reactants. The base used in the aqueous solution (A) may vary widely, and can include an organic base, an inorganic base, and combinations thereof. For example, the base in solution (A) can include inorganic hydroxides, organic hydroxides, carbonates, bicarbonates, sulfides, amines and combinations thereof. Suitable bases include, but are not limited to, NaOH, KOH, Ca(OH)$_2$, Na$_2$CO$_3$, K$_2$CO$_3$, CaCO$_3$, NaHCO$_3$, KHCO$_3$, triethyl amine, pyridine, tetramethylammonium hydroxide and combinations thereof.

The organic chemical mixture (B) includes a monomeric polyfunctional acyl halide reactant, represented by the Formula 2:

Formula 2 wherein $R^1$ represents an organic group selected from aliphatic alicyclic, aromatic, heterocyclic groups and combinations thereof, X is a halide selected from fluorine, chlorine, bromine and iodine, and p represents an integer of 2 or more, 2 to 20, or 2 to 8.

In some embodiments, $R^1$ in the polyfunctional acyl halide reactant of Formula 2 represents an organic group with 1 to 30 carbon atoms, or 1 to 20 carbon atoms, or 1 to 15 carbon atoms. In some embodiments, in the polyfunctional acyl halide reactant of Formula 2, $R^1$ can include an organic group selected from benzene rings, naphthalene rings, cyclohexane rings, admanthane rings, norbornane rings and combinations thereof.

In some embodiments, $R^1$ in the polyfunctional acyl halide reactant of Formula 2 represents an organic group represented by Formula 12,

Formula 12 wherein W represents an organic group selected from CH$_2$, O, S, C=O, SO$_2$, C(CH$_3$)$_2$, C(CF$_3$)$_2$ and combinations thereof, s represents an integer of 0 or 1, and monovalent COX is chemically bonded to the benzene rings, wherein X is independently selected from fluorine, chlorine, bromine and iodine.

In some embodiments, the monomeric polyfunctional acyl halide reactant in solution (B) includes at least one of a divalent organic compound represented by Formula 10 or a trivalent organic compound represented by Formula 11:

Formula 10

Formula 11 wherein $R^{23}$, $R^{24}$, $R^{25}$, $R^{26}$ and $R^{27}$ are each independently selected from monovalent COX, wherein X is independently selected from fluorine, chlorine, bromine and iodine.

In other embodiments, the monomeric polyfunctional acyl halide reactant in solution (B) includes at least one of a compound selected from a trivalent organic compound represented by Formula 13 or a divalent organic compound represented by Formula 14:

Formula 13

Formula 14 wherein $R^{28}$, $R^{29}$, $R^{30}$, $R^{31}$ and $R^{32}$ are each independently selected from monovalent COX, and X is independently selected from fluorine, chlorine, bromine and iodine, wherein W represents an organic group selected from CH$_2$, O, S, C=O, SO$_2$, C(CH$_3$)$_2$, C(CF$_3$)$_2$ and combinations thereof, and wherein s represents an integer of 0 or 1.

In other embodiments, the monomeric polyfunctional acyl halide reactant in solution (B) includes a compound selected from any of the compounds in Formulas 37 through 61, and combinations thereof:

Formula 37

Formula 38

Formula 39

Formula 40

Formula 41

Formula 42

Formula 43

Formula 44

Formula 45

Formula 46

Formula 47

Formula 48

Formula 49

Formula 48

Formula 50

Formula 51

Formula 52

Formula 53

Formula 54

Formula 55

Formula 56

Formula 57

Formula 58

Formula 59

Formula 60

Formula 61

The organic solvent used in the organic solution (B) may vary widely, and can include organic compounds with 1 to 20 carbon atoms, or 1 to 16 carbon atoms, or 1 to 12 carbon atoms. Suitable organic solvents include, but are not limited to, n-hexane, n-heptane, n-octane, n-decane, n-dodecane, carbon tetrachloride, chloroform, dichloromethane, chlorobenzene, xylene, toluene, benzene and combinations thereof.

Optionally, a phase transfer catalyst or surfactant or other additives can be added to solution (A) and/or (B) to enhance reactivity or to improve membrane performance.

The concentration of the monomeric polyamine reactants in the aqueous solution (A) or the acyl halide reactants in the organic solution (B) can vary widely. For example, the concentration of the monomeric polyamine reactants in the aqueous solution (A) can range from 0.01% (w/v) to 20% (w/v), or 0.5% to 10% (w/v), or 1% to 5%. Similarly, the concentration of the acryl halide reactants in the organic solution (B) can range from 0.01% (w/v) to 10% (w/v), or 0.05% to 5% (w/v), or 0.1% to 2%.

The functional groups on the monomeric reactants are selected to provide a crosslinked polymeric reaction product. For example, diamine monomers will always make a crosslinked polyamide by reacting with trimesoyl chloride (TMC). After the interfacially polymerized, crosslinked aromatic polyamide has been formed, its crosslink density can be further increased by post-polymerization reactions with crosslinking or molecular weight-increasing agents such as methane sulfonyl halides, epihalohydrins, trimethylamine-sulfur trioxide complex, formaldehyde, glyoxal, and the like.

Referring again to FIG. 1, the crosslinked polyamide layer 12 formed on the support 10 by the reaction between solution (A) and solution (B) includes free acid halide groups that did not react with amines in the interfacial polymerization step. These unreacted acid halides eventually hydrolyze to carboxylic acid groups as normally observed at the surface of reverse osmosis (RO) membranes. However, this hydrolysis reaction is relatively slow, and in the present invention an additional crosslinked layer 14 is formed on the crosslinked polyamide layer 12 by reacting (Step II IP) the unreacted acid halides in the layer 12 with an aqueous, basic chemical mixture (C). The chemical mixture (C) includes a monomeric polyamine reactant that is structurally different from the polyamine reactant in the chemical mixture (A). Like the chemical mixtures (A) and (B) above, the chemical mixture (C) can be a solution, a dispersion, or a combination thereof. Preferably, like both chemical mixtures (A) and (B), the chemical mixture (C) is a solution. The surface of the first crosslinked polyamide layer 12 has multiple unreacted acid chloride groups, which react with diamines in the chemical mixture (C) to form the second crosslinked polyamide layer 14.

In one embodiment, the chemical mixture (C) includes a monomeric polyamine reactant having a fluoroalcohol moiety. In one preferred embodiment, the chemical mixture (C) includes a monomeric polyamine reactant having one or more hexafluoroalcohol groups, represented by Formula 1A:

$$\left( HO - \underset{\underset{CF_3}{|}}{\overset{\overset{CF_3}{|}}{C}} \right)_n - R^0 - (NH_2)_m$$

Formula 1A wherein
$R^0$ represents an organic group selected from aliphatic, alicyclic, aromatic, heterocyclic groups and combinations thereof, n represents an integer of 1 or more, 1 to 20, or 1 to 8; and m represents an integer of 2 or more, 2 to 20, or 2 to 8.

In some embodiments, $R^0$ in the monomeric polyamine reactant of Formula 1A represents an organic group with 2 to 30 carbon atoms, or 2 to 20 carbon atoms, or 6 to 20 carbon atoms. For example, $R^0$ can include an aromatic organic group selected from benzene rings, naphthalene rings, cyclohexane rings, admanthane rings, norbornane rings and combinations thereof.

In one embodiment, in the monomeric polyamine reactant of Formula 1A, $R^0$ is an organic group represented by Formula 3:

Formula 3 wherein Y represents an organic group selected from $CH_2$, O, S, C=O, $SO_2$, $C(CH_3)_2$, $C(CF_3)_2$ and combinations thereof, and r represents an integer of 0 or 1. In Formula 3, a monovalent amino $(NH_2)$ and a monovalent hexafluoroalkyl $[C(CF_3)_2OH]$ group are each chemically bonded to the benzene rings.

In another embodiment, in the monomeric polyamine reactant of Formula 1A, $R^0$ is an organic group represented by Formula 4:

Formula 4 wherein a monovalent amino $(NH_2)$ and a monovalent hexafluoroalkyl $[C(CF_3)_2OH]$ group are each chemically bonded to the naphthalene rings.

In another embodiment, the monomeric polyamine reactant (C) includes at least one of a compound selected from a tetravalent organic compound represented by Formula 6 or a trivalent organic compound represented by Formula 7:

Formula 6

$$\underset{R^5}{\overset{R^4}{\diagdown}} \diagup \diagdown - (Y)_r - \diagdown \diagup \underset{R^3}{\overset{R^2}{\diagdown}}$$

Formula 7 wherein $R^2$, $R^3$, $R^4$, $R^5$, $R^6$, $R^7$ and $R^8$ are each independently selected from $NH_2$ and $C(CF_3)_2OH$; wherein Y represents an organic group selected from $CH_2$, O, S, C=O, $SO_2$, $C(CH_3)_2$, $C(CF_3)_2$ and combinations thereof, and wherein r represents an integer of 0 or 1.

In another embodiment, the monomeric polyamine reactant in aqueous solution (C) includes at least one of a compound selected from a tetravalent organic compound represented by Formula 8 or a trivalent organic compound represented by Formula 9:

Formula 8

Formula 9 wherein $R^9$, $R^{10}$, $R^{11}$, $R^{12}$, $R^{13}$, $R^{14}$ and $R^{15}$ are each independently selected from $NH_2$ and $C(CF_3)_2OH$.

In another embodiment, the monomeric polyamine reactant in aqueous solution (C) includes at least one of a compound selected from a trivalent organic compound represented by Formula 10 or a tetravalent organic compound represented by Formula 11,

Formula 10

Formula 11 wherein $R^{16}$, $R^{17}$, $R^{18}$, $R^{19}$, $R^{20}$, $R^{21}$ and $R^{22}$ are each independently selected from $NH_2$ and $C(CF_3)_2OH$.

In other embodiments, the monomeric polyamine reactant in the aqueous solution (C) is represented by any of the Formulas 15 through 36, or combinations thereof:

Formula 15

Formula 16

Formula 17

Formula 18

Formula 19

Formula 20

Formula 21

Formula 22

Formula 23

Formula 24

Formula 25

Formula 26

Formula 27

Formula 28

Formula 29

Formula 30

Formula 31

Formula 32

Formula 33

Formula 34

Formula 35

Formula 36

The base used in the aqueous solution (C) may vary widely, and can include an organic base, an inorganic base, and combinations thereof. For example, the base in solution (C) can include inorganic hydroxides, organic hydroxides, carbonates, bicarbonates, sulfides, amines and combinations thereof. Suitable bases include, but are not limited to, NaOH, KOH, $Ca(OH)_2$, $Na_2CO_3$, $K_2CO_3$, $CaCO_3$, $NaHCO_3$, $KHCO_3$, triethyl amine, pyridine, tetramethylammonium hydroxide and combinations thereof.

The concentration of the monomeric polyamine reactants in the aqueous solution (C) can vary widely. For example, the concentration of the monomeric polyamine reactants in the aqueous solution (C) can range from 0.01% (w/v) to 20% (w/v), or 0.5% to 10% (w/v), or 1% to 5%.

In one embodiment particularly well suited for making the layer 14, hexafluoroalcohol substituted aromatic diamines (for example, HFA-MDA and HFA-ODA) in aqueous solution (C) may be reacted with the unreacted halide groups on an aromatic acid chloride such as trimesoyl chloride (TMC) in the layer 12 (see Reaction 1 below). The top-surface of the layer 14 contains unreacted free amines because the interfacial polymerization occurs in an excess amine solution having a limited amount of acid chlorides available for reaction.

4. HFA-Polyamides

In another embodiment, the present invention is a method for making a TFC membrane including a multi-layered active layer on a support. Referring again to the example process shown in FIG. 1, one embodiment for making the multi-layered active layer will be discussed in more detail, which is not intended to be limiting. In this embodiment, the pretreated support membrane 10 is placed in the aqueous solution (A) for several minutes, typically about 1 minute to about 5 minutes. Although the method of FIG. 1 includes placing the support membrane 10 in the aqueous solution (A), alternatively the method may be initiated by placing the support membrane 10 in the aqueous solution (C).

Excess solution is drained from the dip-coated surface of the support membrane 10 (or excess solution is removed by rolling with rubber roller) and the coated support membrane 10 is optionally dried for about 1 minute to about 10 minutes in air at room temperature.

The diamine saturated support membrane 10 is then immersed in solution (B), and after about 1 min of reaction, the first active membrane layer 12 is formed on the support 10. The construction including the active membrane layer 12 and the support 10 is then placed in the aqueous basic solution (C) for about 1 minute to about 10 minutes, typically about 5 minutes. The construction including the active membrane layer 12 and the support 10 may optionally be dried before insertion into the aqueous solution (C) (or (A), if the solution (C) was applied to the support 10 at the initial step).

After about 1 minute to about 10 minutes of reaction, typically about 5 minutes, the second active membrane layer 14 is formed on the first active membrane layer 12 to form the multi-layered composite membrane 20.

The multi-layered composite membrane 20 may then optionally be dried. The drying conditions can vary widely, but in some embodiments the membrane 20 is dried about 1 minute to about 5 minutes in air at room temperature, or optionally in an oven maintained at a temperature of about 30° C. to about 70° C. for about 1 minute to about 5 minutes.

The membrane 20 may optionally be rinsed with, for example, 0.2% (w/w) sodium carbonate solution for approximately 5 min and stored in water prior membrane testing.

The active layer of the membrane preferably has a thickness of less than about 1 micron, and in some embodiments may have a thickness of less than about 500 nanometers.

Chemical or physical treatments (plasma or UV-ozone) can be optionally used to increase the hydrophilicity of a surface of the support membrane 10, prior to introducing the support membrane 10 into the solution (A). While not wishing to be bound by any theory, presently available evidence indicates that plasma and/or UV-ozone treatment of a polysulfone support generates a more hydrophilic surface (complete wetting by water), so it can enhance the density of the coverage of the polyamide monomer on the support layer.

Additional structural integrity can optionally be provided for the composite membrane 20 by laminating the composite 20 to a second support film or layer. The second support film or layer is preferably a flexible, porous, organic polymeric material that can be fibrous in nature if desired. An example of a fibrous backup or support material is a paper-like web of spun-bonded polymeric (e.g. polyethylene) fibers having diameters in the micrometer range.

Flat sheet-type (for example, spiral wound-type) water purification or permselective modules utilizing the composite membranes 20 described herein are useful for applications such as, for example, desalination of seawater, brackish water desalting, whey concentration, electroplating chemical recovery, softening of hard water for municipal or home use, boiler feed water treatment, and other water treatments which involve removal of a solute or contaminant.

The present invention will now be described with reference to the following non-limiting examples.

EXAMPLES

Reagents and Supplies 3,3'-Bis(1-hydroxy-1-trifluoromethyl-2,2,2-trifluoroethyl)-4,4'-methylene-dianiline (HFA-MDA) was provided by Central Glass, Inc. (Japan) and used as received.

m-Phenylene diamine (MPD flakes, >99%) and trimesoyl chloride (TMC, 98%)), sodium arsenate ($Na_2HAsO_4.7H_2O$, 99%), and arsenic (III) oxide ($As_2O_3$, >99.5%) were purchased from Sigma-Aldrich, and the TMC was distilled before use.

Sodium chloride (NaCl), sodium hydroxide (NaOH, pellets) and sodium carbonate ($Na_2CO_3$) were purchased from J. T. Baker.

Hexane was purchased from OmniSolv. Deionized water was used for all experiments.

Polysulfone (PSF) ultrafiltration (UF) membranes were purchased from Sepro Membranes, Inc.

Example 1

Fabrication of REF-PA Membrane

A reference polyamide TFC membrane, REF-PA, was synthesized on a pre-formed polysulfone (PSF) ultrafiltration membrane by single-step interfacial polymerization. The PSF membrane was placed in an aqueous solution of 2% (w/v) MPD for 2 min, and the MPD soaked support membrane was then rolled with a rubber roller to remove excess solution. The MPD saturated membrane was then immersed in a solution of 0.1% (w/v) trimesoyl chlroride (TMC) in hexane. After 1 min of reaction, the resulting membrane was rinsed with an aqueous solution of 0.2% (w/v) sodium carbonate for 5 min and stored in pure water until the membrane was evaluated.

Example 2

Fabrication of REF-HFA-PA Membrane

A layered polyamide TFC membrane, REF-HFA-PA, was synthesized on a pre-formed polysulfone (PSF) ultrafiltration membrane by sequential interfacial polymerization. The PSF membrane was placed in an aqueous solution of 2% (w/v) MPD for 2 min, and the MPD soaked support membrane was then rolled with a rubber roller to remove excess solution. The MPD saturated membrane was then immersed in a solution of 0.1% (w/v) trimesoyl chlroride (TMC) in hexane. After 1 min of reaction, the resulting membrane was dried and placed in an aqueous basic solution of 2% (w/v) HFA-MDA diamine for 5 min (2 eq. of NaOH was added to completely dissolve the HFA-MDA monomer). The resulting membrane was then dried for 5 min, rinsed with an aqueous solution of 0.2% (w/v) sodium carbonate for 5 min, and stored in pure water until the membrane was evaluated.

Example 3

Evaluation of Membrane Performance (NaCl Rejection and Water Flux)

Membrane performance was evaluated using a crossflow filtration system at 400 psi (flow rate=1 Gal min$^{-1}$). The pure water flux was measured at room temperature after the membrane was compressed for 5 hours at 400 psi. The salt rejection was then measured with a 2000 ppm aqueous solution of NaCl at the same pressure. The pH of the feed water was controlled by using diluted HCl and NaOH solutions. The water flux and salt rejection values obtained with the REF-PA and REF-HFA-PA membranes are summarized in Table 1 below.

TABLE 1

|  | Feed Water pH | REF-PA | REF-HFA-PA | Difference |
|---|---|---|---|---|
| Water Flux (L m$^{-2}$ h$^{-1}$) | 6.8 | 64.9 | 60.0 | −4.9 |
|  | 9.8 | 70.7 | 67.2 | −3.5 |
| NaCl Rejection (%) | 6.8 | 99.78 | 99.90 | +0.12 |
|  | 9.8 | 99.75 | 99.83 | +0.08 |

Table 1 shows the water flux and salt rejection rates measured with the REF-PA and REF-HFA-PA membranes under Lab-scale crossflow filtration tested with a 2000 ppm NaCl feed solution at neutral (feed pH=6.8) and basic conditions (feed pH=9.8). The REF-HFA-PA showed improved salt rejection (av. 0.1% increment) with ignorable loss of water flux (3~5 LMH decrement) compared to REF-PA.

Figure 2:
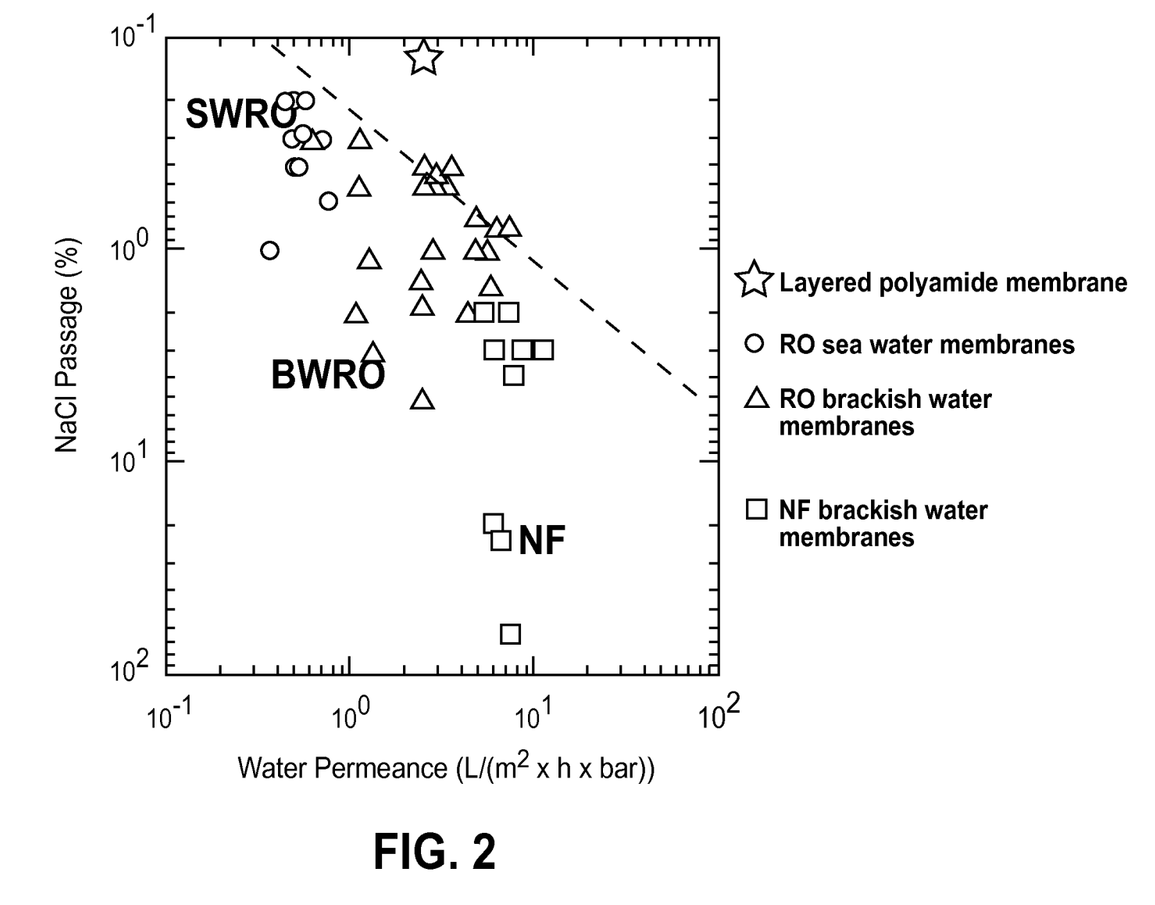
FIG. 2 is a plot of salt passage (%) vs. water permeance (L $m^{-2}h^{-1}bar^{-1}$) for a REF-HFA-PA membrane and commercial RO/NF membranes. The black dotted line is the trade-off curve between water permeance and salt passage.

The performance (salt rejection: 99.8%, water flux: ca. 60 L m$^{-2}$h$^{-1}$) of the REF-HFA-PA membrane was directly compared with commercial RO/NF membranes by plotting their separation data. FIG. 2 shows the graph of water permeance vs. salt passage measured with a REF-HFA-PA membrane and commercial membranes including seawater desalination (SWRO), brackish water desalination (BWRO), and nanofiltration (NF) membranes. The data for the commercial membranes were extracted from the manufacturer's specifications, and the black dotted line indicates a tradeoff curve between water permeance and salt passage shown in commercial membranes. The layered polyamide membrane, REF-HFA-PA, exhibits a very attractive combination of both water permeance and salt passage. (The star symbol exists above the tradeoff curve in FIG. 2.) The salt passage rate is very low, and it is even lower than that of the SWRO membranes, while the water permeance is much higher than the flux range of the SWRO membranes. The reduced salt passage (enhanced salt rejection) is likely due to the additional polyamide top-layer bearing HFA functionality.

Example 4

Evaluation of Arsenic Removal Efficiency

Arsenate (As(V)) Filtration: 4 mg of Na$_2$HAsO$_4$ (As(V)) was dissolved in 14 mL of pure water. 12.5 mL of this solution was added to 4 gallons of water (this produced an As(V) ion concentration of approximately 200 microgram/L). 8.8 grams of NaCl was added to the solution (10 mM NaCl, 200 ug As(V)/L, 10 mM NaCl, pH=7.3). As(V) rejection was measured with this feed solution by using a cross-flow filtration system at 400 psi. The pH of the feed solution was adjusted using 1M NaOH. 15 mL of permeate was collected for each test and the As(V) concentration of the permeate samples was analyzed by Inductively Coupled Plasma Mass Spectroscopy (ICP-MS).

Arsenite (As(III)) Filtration: 10 mg of As$_2$O$_3$ (As(III)) was dissolved in approximately 10 mL of a 0.2 M HCl solution under sonication for a couple of hours. 4 mL of this solution was added to 4 gallons of feed water, thereby yielding an As(III) concentration of 200 ug/L. All other procedures were followed as in the As(V) filtration experiments above.

Example 5

Evaluation of Boron Removal Efficiency 75.5 mg of H$_3$BO$_3$ (B(III)) was dissolved in 100 mL of pure water, and this solution was added to 4 gallons of water (B(III) concentration: 5 mg/L). Boron rejection was measured with this feed solution by using a cross-flow filtration system at 400 psi. The pH of the feed solution was adjusted using 1M NaOH. 15 mL of permeate was collected for each test, and the boron concentration of the permeate samples was analyzed by Inductively Coupled Plasma Mass Spectroscopy (ICP-MS).

The layered polyamide membrane also showed outstanding efficiency in removing harmful toxins such as boron and arsenic from water. Boron and arsenic (specifically arsenite: As(III)) rejection rates normally depend on the pH of feed water because some of these compounds are non-ionic at neutral conditions and become ionic at basic conditions (pH ≥9.0). It is reported that 30~60% of boron can be removed by commercial RO membranes at neutral pH, and the rejection rate increases up to 90~95% at basic pH (pH 10~11). One of the commercial RO membranes (ES-10 from Nitto Denko) showed 85% of arsenate (As(V)) and 50% of arsenite (As(III)) rejection rates under acidic conditions, but the rejection rates reached almost 90% for both species under basic conditions.

Table 2 below shows boron and arsenic (As(V) and As(III)) rejection rates measured with REF-HFA-PA membrane at various pHs. The filtration experiment was performed with a crossflow filtration system at 400 psi (flow rate=1 Gal min$^{-1}$).

TABLE 2

| pH of feed water | Boron: B(III) | Arsenate: As(V) | Arsenite: As(III) |
|---|---|---|---|
| pH 3.9 (acidic) | | — | 90.65 |
| pH 6.4~pH 7.3 (neutral) | 80.4% | 99.99% | 92.54 |
| pH 9.8~pH 10.5 (basic) | 98.0% | 99.40% | 96.11 |
| pH 11.5 (strongly basic) | 100.0% | — | 98.28 |

The membrane filtered out more than 80% of boron from water at neutral pH and removed more than 98.0% of boron at high pH (pH 10~12), which is superior to the performance of commercial RO membranes. The membrane also effectively filtered out the predominant arsenic species, As(V) and As(III), even under neutral and acidic conditions (more than 99.9% rejection for As(V) and 92.5% rejection for As(III)) at pH 7.3). For arsenite (As(III)), the rejection was increased up to 98.3% by increasing the pH of the feed water to 11.5.

While not wishing to be bound by any theory, the improved performance of the REF-HFA-PA in salt rejection and toxin removal may come from the synergetic effect of the aromatic polyamide under-layer, which is the same material used for commercial RO membranes, and the HFA-substituted aromatic polyamide top-layer.

Various embodiments of the invention have been described. These and other embodiments are within the scope of the following claims.

The invention claimed is:

1. A polymeric membrane comprising an active layer on a support, wherein the active layer comprises a first film on the support, wherein the first film comprises a crosslinked, aromatic polyamide; and a second film on the first film, wherein the second film comprises a crosslinked aromatic polyamide bearing a fluoroalcohol moiety, and wherein the films are crosslinked with each other at an interface.

2. The membrane of claim 1, wherein the active layer has a thickness of less than 1 micron.

3. The membrane of claim 1, wherein the active layer has a thickness of less than 500 nanometers.

4. The membrane of claim 1, wherein the fluoroalcohol moiety is a hexafluoroalcohol.

5. The membrane of claim 1, wherein the fluoroalcohol moiety is in an ionic form.

6. The membrane of claim 1, wherein the support is an ultrafiltration membrane.

7. The membrane of claim 6, wherein the ultrafiltration membrane is selected from at least one of polyethersulfone, poly(vinylidene floride), polyetherimide and polyacrylonitrile.

8. The membrane of claim 7, wherein the ultrafiltration membrane comprises a polyethersulfone.

* * * * *